Patented Aug. 28, 1945

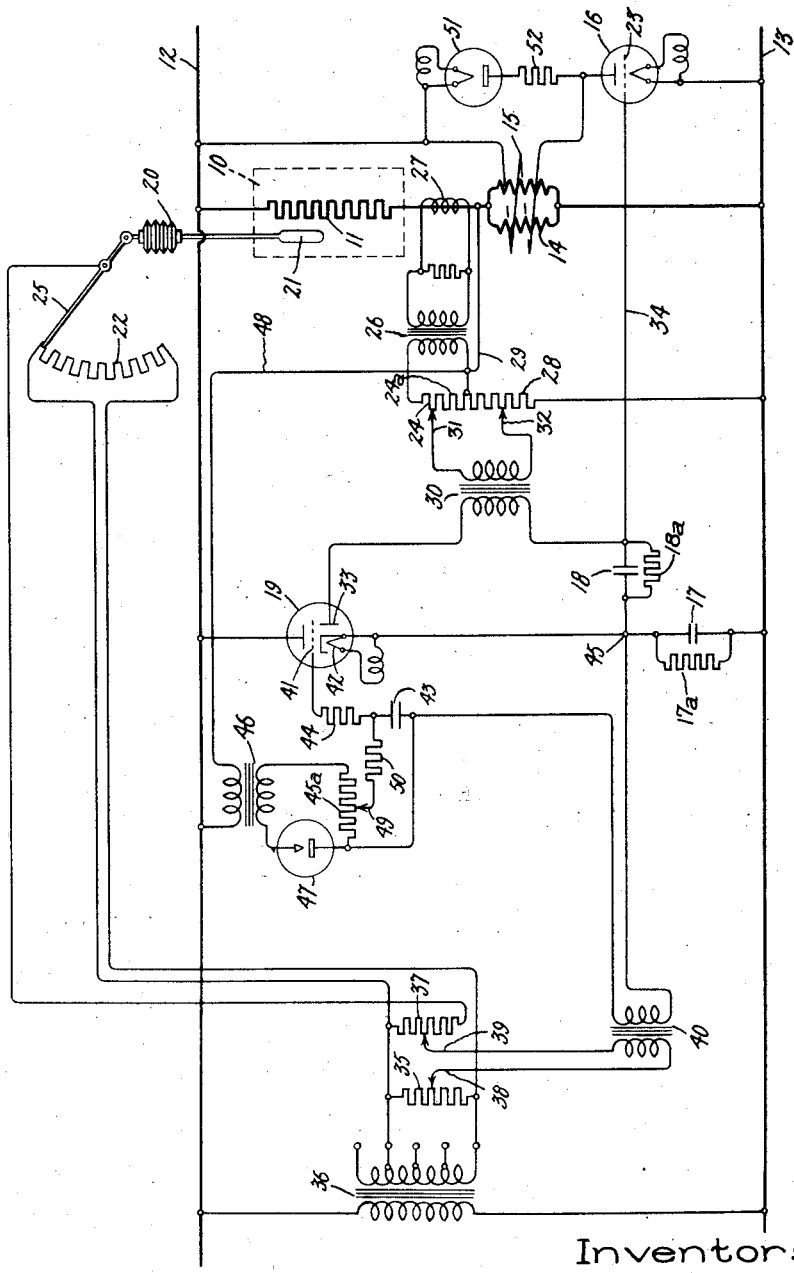

2,383,806

UNITED STATES PATENT OFFICE 2,383,806

TEMPERATURE CONTROL SYSTEM

Ernest F. Kubler, Pittsfield, Mass., Elbert D. Schneider, Scotia, N. Y., and Gordon C. Nonken, Pittsfield, Mass., assignors to General Electric Company, a corporation of New York Application April 1, 1943, Serial No. 481,448

7 Claims. (Cl. 219—20)

Our invention relates to temperature control systems such as used in the control of resistor heated devices, furnaces and the like, and has for its object a simple and reliable system giving close regulation of the temperature of the device and limitation of the heating current to a predetermined maximum in a heating resistor whose resistance varies over a wide range in response to changes in the temperature of the resistor.

Our invention is particularly applicable to heating devices which are heated by a resistor whose resistance varies widely between the cold or ambient temperature and the desired working temperature of the device. For example, in a certain furnace having a heating resistor made of molybdenum, the resistance of the resistor varied from about .2 ohm at room temperature to about .8 ohm at the final operating temperature. With such a wide positive variation in resistance, the current in the resistor when starting at room temperatures may be excessively high when the feedback or limit control for the resistor is responsive to the voltage across the resistor, such as in the control system described and claimed in Patent No. 2,266,569, issued on December 16, 1941, to Elbert D. Schneider and August R. Ryan.

In accordance with our invention, we provide feedback means responsive to the current in the resistor for controlling and limiting the current supplied to the resistor when the resistance of the resistor is low. In this manner, the current is maintained within desirable limits, irrespective of variations in the resistance.

For a more complete understanding of this invention, reference should be had to the accompanying drawing the single figure of which is a diagrammatic representation of a system of control for an electric furnace embodying our invention.

Referring to the drawing, we have shown our invention in one form as applied to a temperature control system of the type described and claimed in the aforesaid Schneider and Ryan patent. The system comprises an electric furnace 10 provided with a heating resistor 11, made of a suitable material having a positive temperature coefficient of resistance, such as molybdenum, which is supplied with energy from suitable alternating current supply mains 12 and 13. For the control of the resistor, a reactor coil 14 having a saturable iron core is connected in series with the resistor to the supply mains 12 and 13. This reactor can be saturated to the desired degree thereby to control the current in the resistor by regulating the pulsating direct current supplied to the saturating winding 15 by means of an electric valve device 16. This discharge device 16, which is preferably of a three-element vapor electric type characterized by a large power output controlled by a small amount of grid energy, is controlled through the agency of condensers or capacitors 17 and 18. In turn the charge and voltage across the condensers 17 and 18 are controlled respectively in accordance with the temperature of the furnace and the current in the resistor.

A suitable furnace temperature responsive means, shown as an expansible bellows 20, is provided for controlling the discharge device 19 thereby to control the voltage across the capacitor 17. This bellows 20 is connected through a tube to a bulb 21 in the furnace, the bellows tube and bulb being sealed and filled with a liquid or gas whose volume changes in response to changes in the temperature of the bulb. The bellows is thus caused to actuate a contact arm 25 over a potentiometer control resistor 22 so as to vary the amount of the resistance 22 connected in a control circuit for the discharge device 19. It will be understood that the bulb 21 or other temperature responsive means is located in position in the furnace so as to be heated by a furnace operating temperature which is to be regulated, such as the temperature of the charge in the furnace or the temperature of the furnace atmosphere. The resistor 11 probably will be at a higher temperature.

The capacitor 18 introduces a feed back control for the discharge device 16, which control is directly responsive to the current in the resistor and the voltage across the reactor 14, this capacitor 18 being charged with a polarity opposite to the polarity of the capacitor 17. At the predetermined furnace temperature for which the control apparatus is adjusted the differential voltage applied to the grid 23 of the device 16, i. e., the capacitor 17 voltage minus the capacitor 18 voltage, is just sufficient to cause the discharge device 16 to control the current to the saturating winding 15 which, in turn, controls the current to the resistor to maintain this predetermined temperature.

This control of the discharge device 16 through the two condensers 17 and 18 is described and claimed in U. S. Patent No. 1,904,485, issued to Orrin W. Livingston on April 18, 1933. By means of resistances 17a and 18a connected in parallel, respectively, with the capacitors 17 and 18, a pulsating capacitor differential voltage is obtained which is applied to the grid 23. The phase relation of this pulsating voltage to the anode voltage of the device 16 varies with the relative values of the capacitor voltages so that the discharge device 16 is controlled in response to this differential pulsating voltage to pass current through portions of the positive half cycles, depending upon the differential voltage. The resistance 17a is of a high value so as to maintain a substantially constant voltage across the capacitor 17 from the pulsating voltage supplied by the discharge device 19. In other words, the resistance is of such high value that the capacitor voltage decreases very little by leakage through the resistance between the voltage pulsations supplied by the device 19. On the other hand, the resistance 18a is of a relatively low value providing for leakage through it and thereby producing a pulsating voltage across the capacitor 18 and a pulsating differential voltage.

This control for the capacitor 18 comprises a potentiometer resistance 24 having its lower end, as shown, connected directly to the supply main 13 to which, also, one terminal of the reactor 14 is connected. An upper section 24a of the resistance has connected across it the secondary winding of a transformer 26 whose primary winding is connected to a current transformer 27 in circuit with the resistor 10. The upper end of the lower section 28 of the resistor is connected through a conductor 29 to the furnace circuit at a point between the resistor and the reactor 14 so that the voltage across the reactor is applied to this section 28 of the resistance. This voltage across the reactor 14 is inversely related to the voltage across the resistor, since the voltage across the resistor is the difference between the supply voltage and the reactor voltage.

A second transformer 30 has its primary winding connected through adjustable taps 31 and 32 to the resistance 24 and its secondary winding connected in a rectifying circuit of the discharge device 19, the upper end of this secondary winding being connected to an anode 33 of the device 19, while its lower end is connected to a conductor 34 connecting the capacitor 18 with the grid 23.

In the operation of the system, the capacitor 17 is charged from the supply mains 12 and 13 through the discharge device 19, the amount of charge and voltage across the capacitor 17 depending upon the position of the contact 25.

The capacitor 18 is in turn charged to a voltage which is dependent upon the current in the resistor, as determined by the voltage supplied by the current transformer 27, and also dependent upon the voltage across the reactor 14.

Assuming that the furnace 10 is at the ambient temperature and is to be heated, the supply mains 12 and 13 are connected by suitable switches (not shown) to a suitable source of alternating current supply. At this time, the contact arm 25 is in an elevated position on the resistance 22 such as shown in the drawing. This position of the contact arm 25 charges the capacitor 17 to a maximum voltage ready to effect full saturation of the reactor. The reactor 14 at this time is unsaturated and limits the current in resistor 11, the resistance of resistor 11 being of a low value, to a predetermined maximum value. This maximum predetermined current produces a voltage through the transformer 27 and applied to the resistance 24 which is of sufficient value when added to the voltage of the reactor 14 applied to the resistance 24 to cause a relatively high voltage pulsating charge on the capacitor 18. Under these starting conditions, the pulsating difference in the voltages of the two capacitors is such as to provide only a small current in the coil 15 and slight saturation of the reactor 14 thereby to limit the current in the resistor 11 to the predetermined maximum value.

Without this current responsive voltage applied to the control by the transformer 27, such as with the system of the aforesaid Schneider and Ryan patent, when the furnace is started at an ambient temperature, the reactor is quickly saturated to a high value corresponding to the position of the contact arm 25 and a predetermined maximum voltage across the resistor 11. Thus with the resistor having .8 ohm resistance at its operating temperature for which the predetermined maximum voltage is adapted but only .2 ohm resistance at ambient temperatures, the current with this maximum voltage and low resistance would be several times greater than the normal maximum current at operating temperatures. This high current, if permitted, would damage the resistor. In accordance with our invention, the current is automatically limited to a predetermined maximum value at all times including the time when the resistance of the resistor is lower than its operating temperature value.

As the temperature of the resistor now increases, its resistance increases which tends to increase the voltage across it and decrease the current flowing in it and the voltage supplied by the transformer 27. The voltage across the reactor also decreases and the result is a decreased voltage applied to the resistance 24 which decreases the pulsating voltage on the capacitor 18 thereby to cause the discharge device 16 to operate over greater portions of its half cycles to increase the saturation of the reactor 14 and increase the voltage applied to the resistor, thereby to maintain substantially the predetermined maximum current in the resistor. At this time during the heating of the resistor itself, the furnace temperature will also rise and move the contact arm 25 downward to decrease the charge on the capacitor 17. In the molybdenum resistor furnace referred to, the resistor required a two-hour period to reach its operating temperature.

During this resistor heating up period with a predetermined maximum current, the effect of the contact arm 25 in reducing the charge on the capacitor 17 is more than offset by the effect of the increasing resistance of the resistor in reducing the voltage across the reactor and the charge on the capacitor 18, and the reactor 14 is gradually saturated to maintain the predetermined maximum current by the effect of the increase in the resistance of the resistor itself. Finally, when the resistor has reached substantially its operating temperature and maximum operating resistance, the reactor 14 will be substantially completely saturated for full power input to the resistor as long as the furnace temperature, such as the temperature of the charge or furnace atmosphere, to which the bulb 21 is responsive has not reached the desired operating temperature.

From now on, the contact arm 25 in response to temperature controls the furnace by controlling the charge on the capacitor 17. As the furnace temperature increases, the voltage across the capacitor 17 is decreased by movement of the contact arm 25 whereby the current in the control winding 15 is decreased with decreased saturation of the reactor and decreased resistor current. Thus the power input to the resistor is gradually decreased as the desired maximum furnace temperature is approached.

During this action the voltage across the reactor 14 which is applied to the resistance 24 increases, but at the same time the decreasing resistor current applies a decreasing current responsive voltage to the resistance 24. Thus these two voltage changes substantially offset each other to maintain a substantially constant pulsating change on the capacitor 18.

Finally, when the predetermined furnace temperature is reached, the contact arm 25 will be in such a position that the saturation of the reactor 14 provides for a resistor current which is just sufficient to maintain this predetermined temperature of the furnace. Any variation in this temperature either above or below produces movement of the contact arm 25 and resulting change in saturation of the reactor 14 to bring the temperature back to the predetermined value.

It will be observed that the resistance 22 is connected in parallel with the resistance 35, the two being connected across the secondary winding of a suitable voltage transformer 36 whose primary is connected across the supply mains 12 and 13. A third potentiometer resistance 37 has one end connected to one common terminal of the two resistances 22 and 35 and its other end connected to the contact arm 25. By means of adjustable taps 38 and 39, the voltage between selected points of the resistances 35 and 37 is applied to the primary winding of a transformer 40 whose secondary winding has its terminals connected to the grid 41 and cathode 42 of the discharge device 19 so as to control the voltage across the capacitor 17. A capacitor 43 and a resistance 44 are connected between the upper terminal of the transformer secondary and the grid 39, while the lower terminal of the secondary is connected directly to the point 45 between the cathode 42 and the capacitor 17. Thus it will be observed that movement of the contact arm 25 downward changes the volage applied to the grid 41 and decreases the voltage across the capacitor 17 thereby to decrease the saturation of the reactor.

The capacitor 43 is provided to introduce a control voltage in the same direction and added to the voltage supplied by the transformer 40 so as to compensate, after the desired furnace temperature has been reached, for the change in furnace temperature required to actuate the contact arm 25 so that after each movement of the contact arm in response to an increase or decrease in temperature the contact arm and furnace are brought back, respectively, to the same position and temperature as before. As shown, the capacitor 43 is connected across an adjustable portion of a resistance 45a which is connected across the secondary winding of a transformer 46 in series with a one-way rectifier discharge device 47. The primary winding of this transformer 46 has one terminal connected directly to the supply main 12 and the other terminal connected through a conductor 48 to a point on the furnace circuit between the resistor and the saturable reactor. Thus the transformer 46 is responsive to the voltage applied to the resistor and through the rectifier 47 charges the capacitor 43 with a voltage proportional to this voltage across the resistor. This increased control of the discharge device 19 effected by the voltage across the capacitor 43 causes a small additional change in the energy input to the resistor whereby the furnace temperature after a change is brought back very closely to the original temperature. In a typical furnace, the temperature is brought back to within one-half of one degree centigrade.

The amount of this correction, i. e., the control voltage across the condenser 43, is adjusted by moving the tap 49 on the resistance 45. A resistance 50 is provided of such value as to give a time delay in the change of the charge on the condenser 43 corresponding to the temperature and the voltage across the resistance. This time is preferably about the same as the time required for the furnace temperature to be restored.

The adjustable taps 31 and 32 provide a convenient adjustment means for the electric apparatus. By adjusting the tap 31 the maximum current in resistor 11 can be limited. By adjusting tap 32 the current in resistor 11 can be reduced to a minimum when the furnace temperature is higher than the required temperature.

In adjusting the tap 32, the supply mains 12 and 13 are energized and the furnace operated at least long enough to heat the resistor 11 to its operating temperature or nearly to that temperature. The capacitor 17 is then fully discharged and the tap 32 moved downward on the resistance 24 to such a point that the discharge device 16 does not pass any current. Under these conditions, the current transformer 27 supplies substantially no voltage to the resistance 24 because the current which flows in the resistor 11 is small. With this adjustment any voltage across the condenser 17 thereafter produced by the operation of the device 19 starts operation of the discharge device 16 throughout portions of its positive half cycles.

Next, the capacitor 17 is fully charged, and the tap 31 is adjusted by moving it upward on the resistance 24 until the current in resistor 11 begins to decrease as indicated by a suitable ammeter, not shown. This decrease in the current in the resistor indicates that the reactor is just fully saturated and, in other words, the winding 15 is supplied with only sufficient current to saturate the reactor. It will be understood that if the current in the winding 15 is increased beyond the point of substantial saturation of the reactor, but little if any useful purpose is served by this increase in current which is prevented by this adjustment of the tap 31. Also, the tap 32 may be adjusted to vary the sensitivity of the response of the control to temperature.

A suitable half wave rectifying discharge device 51 is connected in parallel with the saturating winding 15 for the purpose of passing current during the half cycles that the discharge device 16 is not operating thereby to prevent substantial change in the current in the winding 15.

A resistance 52 is provided to limit the short circuit current in the event either discharge device 16 or 51 should arc back for one or more cycles.

If desired, a separate alternating current source may be connected to apply a voltage to the lower portion 28 of the resistor 24 instead of utilizing, as shown, the voltage across the reactor 14. This would be advantageous when the mains 12 and 13 are supplied with high voltage, such as 2300 volts. Such high voltage would have to be stepped down through transformers for use in the control circuits.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. In a temperature control system, an electric heating resistor having a substantial temperature coefficient of resistance, connections for supplying a heating current to said resistor, means for controlling the current in said resistor, temperature responsive means for operating said control means to vary the current supplied to said resistor, and means responsive to the current in said resistor for operating said control means to limit the current in said resistor throughout a predetermined temperature range of said resistor over which the resistance of said resistor varies widely.

2. A temperature control system for a heated device provided with an electric heating resistor having a substantial positive temperature coefficient of resistance comprising connections for supplying a heating current to said resistor, means for controlling the current in said resistor, temperature responsive means responsive to an operating temperature in said furnace for operating said control means to maintain a predetermined operating temperature in said heated device, and means responsive to the current in said resistor for operating said control means to limit the current in said resistor to a predetermined maximum value during the period that said resistor is heating and its resistance is increasing from a relatively low ambient temperature value to a relatively high normal furnace operating temperature value.

3. A temperature control system for an electric furnace or the like provided with a heating resistor having a positive temperature coefficient of resistance comprising a variable impedance device, connections for connecting said variable impedance device in series circuit relation with said resistor, a control winding for varying the impedance of said impedance device, current supply means for said control winding, temperature responsive means for controlling said current supply means thereby to vary the current in said resistor so as to maintain a predetermined temperature, and means responsive to the current in said resistor for controlling said current supply means thereby to limit the current supplied to said resistor to a predetermined maximum value when the temperature and resistance of said resistor are relatively low.

4. A temperature control system for a furnace or the like comprising an electric heating resistor having a substantial temperature coefficient of resistance, connections for supplying a heating current to said resistor, means for controlling the current in said resistor, a capacitor, means responsive to the temperature of the furnace for charging said capacitor, a second capacitor, means responsive to the current in said resistor for charging said second capacitor, and means jointly responsive to the voltages across said capacitors for operating said control means to limit the current in said resistor to a predetermined value throughout a predetermined temperature range of said resistor over which the resistance of said resistor varies widely.

5. A temperature control system comprising electric heating means, variable impedance device connected in circuit with said heating means, control means for said impedance device, a capacitor, means jointly responsive to the current in said heating means and the voltage across said impedance device for charging said capacitor, a second capacitor, temperature responsive means for charging said second capacitor, and means responsive to the difference between the voltages across said capacitors for operating said control means.

6. A temperature control system comprising an electric heating resistor, a saturable core reactor for controlling the current in said resistor, a saturating winding for said reactor, a capacitor, means responsive to the current in said resistor for charging said capacitor, a second capacitor, temperature responsive means for charging said second capacitor, and means responsive to the difference between the voltages across said capacitors for supplying current to said saturating winding.

7. A temperature control system comprising an electric heating resistor, a saturable core reactor connected in series with the resistor, a saturating winding for said reactor, a control resistance, means for applying a voltage across one section of said resistance responsive to the current in said resistor, means for applying a voltage across another section of said resistance responsive to the voltage across said reactor, a transformer provided with two inductively associated windings, adjustable connections between the terminals of one of said windings and said sections of said resistor, a capacitor, means for charging said capacitor in accordance with the voltage of the other of said transformer coils, a second capacitor, temperature responsive means for charging said second capacitor, and means responsive to the difference between the voltages of said capacitors for supplying current to said saturating winding.

ERNEST F. KUBLER.
ELBERT D. SCHNEIDER.
GORDON C. NONKEN.